(12) United States Patent
Hollars et al.

(10) Patent No.: US 9,016,502 B2
(45) Date of Patent: Apr. 28, 2015

(54) METHOD AND APPARATUS FOR GAS CYLINDER SEALING

(71) Applicant: Coravin, LLC, Burlington, MA (US)

(72) Inventors: Anthony Hollars, Tucson, AZ (US); Carey Costle, Tucson, AZ (US)

(73) Assignee: Coravin, Inc., Burlington, MA (US)

( * ) Notice: Subject to any disclaimer, the term of this patent is extended or adjusted under 35 U.S.C. 154(b) by 95 days.

(21) Appl. No.: 13/793,339

(22) Filed: Mar. 11, 2013

(65) Prior Publication Data

US 2014/0097184 A1 Apr. 10, 2014

Related U.S. Application Data

(60) Provisional application No. 61/711,481, filed on Oct. 9, 2012.

(51) Int. Cl.
 *B65D 51/20* (2006.01)
 *F17C 13/06* (2006.01)
 *B65D 51/22* (2006.01)

(52) U.S. Cl.
 CPC .......... *F17C 13/06* (2013.01); *B65D 51/22* (2013.01); *F17C 2201/0104* (2013.01); *F17C 2201/058* (2013.01); *F17C 2205/032* (2013.01); *F17C 2205/0323* (2013.01); *F17C 2221/011* (2013.01); *F17C 2221/012* (2013.01); *F17C 2221/013* (2013.01); *F17C 2221/014* (2013.01); *F17C 2221/017* (2013.01); *F17C 2221/03* (2013.01);
 (Continued)

(58) Field of Classification Search
 CPC ............ F17C 13/06; F17C 2201/0104; F17C 2201/058; F17C 2205/032; F17C 2205/0323; F17C 2221/011; F17C 2221/012; F17C 2221/013; F17C 2221/014; F17C 2221/017; F17C 2221/03; F17C 2223/0123; F17C 2223/036; B65D 51/22
 USPC ............... 220/583, 267, 277, 89.3, 59.3, 304, 220/366.1, 580, 202; 215/257, 247, 297; 222/81, 541.2
 See application file for complete search history.

(56) References Cited

U.S. PATENT DOCUMENTS 718,163 A 1/1903 Sherrard
1,509,916 A 9/1924 Waite
(Continued)

FOREIGN PATENT DOCUMENTS

EP 0258057 A2 3/1988
FR 2257855 A1 8/1975
(Continued)

OTHER PUBLICATIONS

International Search Report and Written Opinion dated Apr. 9, 2014 from corresponding PCT Application No. PCT/US2013/063814.

*Primary Examiner* — Robert J Hicks
*Assistant Examiner* — Kareen Rush
(74) *Attorney, Agent, or Firm* — Wolf, Greenfield & Sacks, P.C.

(57) ABSTRACT

A cap and gasket for a compressed gas cylinder arranged to operate with a gas cylinder having a neck with a top surface around a gas outlet and a side surface extending downwardly from the top surface. The cap may define an inner space to house the gasket and may be attached to the gas cylinder neck. The cap may restrain gasket movement, and define a volume in which the gasket can deform, when making a seal as a piercing element enters the inner space to contact the gas outlet.

23 Claims, 3 Drawing Sheets

(52) U.S. Cl.
CPC ... *F17C 2223/0123* (2013.01); *F17C 2223/036* (2013.01); *F17C 2260/036* (2013.01); *F17C 2270/0736* (2013.01); *Y02E 60/321* (2013.01); *F17C 2205/0308* (2013.01)

(56) References Cited

U.S. PATENT DOCUMENTS

| | | | |
|---|---|---|---|
| 2,367,077 A | | 1/1945 | Ward |
| 2,496,258 A | | 2/1950 | Alexander |
| 2,705,578 A | | 4/1955 | Burns |
| 3,191,533 A | | 6/1965 | Vandenberg |
| 3,200,094 A | | 8/1965 | Levinson et al. |
| 3,272,404 A | | 9/1966 | Graves et al. |
| 3,327,899 A | | 6/1967 | Reynolds et al. |
| 3,542,240 A | * | 11/1970 | Solowey .......... 222/83 |
| 3,883,043 A | | 5/1975 | Lane |
| 3,976,221 A | | 8/1976 | Martin et al. |
| 4,011,971 A | | 3/1977 | Haydon |
| 4,143,678 A | | 3/1979 | Sugimura et al. |
| 4,473,174 A | | 9/1984 | Heuser |
| 4,475,576 A | | 10/1984 | Simon |
| 4,595,121 A | | 6/1986 | Schultz |
| 4,674,662 A | | 6/1987 | Bergstrom et al. |
| 4,691,482 A | | 9/1987 | Heinemann et al. |
| 4,694,850 A | | 9/1987 | Fumino |
| 4,706,847 A | | 11/1987 | Sankey et al. |
| 4,856,680 A | | 8/1989 | Sitton |
| 4,867,209 A | | 9/1989 | Santoiemmo |
| 4,932,561 A | | 6/1990 | Boxall |
| 4,953,741 A | * | 9/1990 | Jessop et al. .......... 220/273 |
| 4,976,984 A | | 12/1990 | Yasukawa et al. |
| 4,982,879 A | | 1/1991 | Corrando et al. |
| 4,984,711 A | | 1/1991 | Ellis |
| 5,020,395 A | | 6/1991 | Mackey |
| 5,031,799 A | | 7/1991 | Owen |
| 5,139,179 A | | 8/1992 | Cecil |
| 5,163,909 A | | 11/1992 | Stewart |
| 5,180,081 A | | 1/1993 | McCann |
| 5,395,012 A | | 3/1995 | Grill et al. |
| 5,407,096 A | | 4/1995 | Smith |
| 5,413,230 A | | 5/1995 | Folter et al. |
| 5,413,247 A | | 5/1995 | Glasa |
| 5,590,696 A | | 1/1997 | Phillips et al. |
| 5,947,172 A | | 9/1999 | Glotin |
| 6,371,173 B1 | | 4/2002 | Liebmann, Jr. |
| 6,607,100 B2 | | 8/2003 | Phelps et al. |
| 6,789,698 B2 | | 9/2004 | Gloor et al. |
| 6,843,388 B1 | | 1/2005 | Hollars |
| 7,056,179 B2 | | 6/2006 | Courtney |
| 7,703,640 B1 | * | 4/2010 | Hollars et al. .......... 222/5 |
| 7,712,637 B2 | | 5/2010 | Lambrecht |
| 8,033,431 B2 | | 10/2011 | Sommerfield et al. |
| 8,225,959 B2 | | 7/2012 | Lambrecht |
| 2010/0206390 A1 | * | 8/2010 | Hollars et al. .......... 137/68.3 |
| 2011/0016692 A1 | | 1/2011 | Hollars |
| 2012/0073674 A1 | | 3/2012 | Tatarek |

FOREIGN PATENT DOCUMENTS

| | | |
|---|---|---|
| FR | 2507735 A1 | 12/1982 |
| GB | 191008433 A | 0/1910 |

* cited by examiner

METHOD AND APPARATUS FOR GAS CYLINDER SEALING

RELATED APPLICATIONS

This application claims the benefit under 35 U.S.C. §119(e) of U.S. provisional application No. 61/711,481, filed Oct. 9, 2012, which is incorporated by reference herein in its entirety.

BACKGROUND

1. Field of Invention

This disclosure relates gaskets or sealing members for use with compressed gas canisters, cylinders or containers.

2. Related Art

The coupling of a compressed gas cylinder, canister or other container (herein referred to as a cylinder) with gas delivery mechanisms that use gas supplied by the cylinder often involves an O-ring or other seal element. Such seal elements are used to help prevent leakage of gas, and are described in U.S. Pat. No. 4,694,850, for example.

SUMMARY

Many commercially available compressed gas cylinders are necessarily high pressured and relatively low volume, and thus any loss of gas in the process of connecting the cylinder to a gas delivery mechanism, or after such connection, is undesirable. One or more embodiments of the invention described herein provide for an improved seal between a cylinder and the gas delivery mechanism. The seal may be operable to help prevent the initial loss of gas as the cylinder is being opened (e.g., via a piercing element) and/or provide a long lasting seal that resists the loss of gas over long periods of time, such as days, weeks or months during storage of the gas delivery mechanism. Also, because a gasket may be mounted on or otherwise coupled to the cylinder and not the gas delivery mechanism, a new gasket may be provided each time a new cylinder is installed, thus eliminating any chance of wear due to repeated use.

In accordance with an aspect of the invention, a gas cylinder sealing arrangement is provided for use with a gas cylinder having a neck which includes a side surface, a top surface and a gas outlet. A piercing element arranged to pierce the gas outlet may be provided, and the sealing arrangement may include a cap having a lower portion arranged to engage with the neck of a gas cylinder, and an upper portion defining an inner space and an upper opening to receive a piercing element. Thus, the cap may define an inverted cup-shaped element with openings at the upper and lower ends. A gasket may be sized to fit in the inner space defined by the upper portion of the cap and have an upper surface arranged to form a seal with the piercing element received in the upper opening of the cap, and a lower surface arranged to form a seal with the top surface of the cylinder. As a result, the cap may function to retain the gasket on the cylinder when the cap is engaged with the cylinder and the gasket is located in the inner space. This may provide a convenient way of assuring that a suitable gasket is provided with the correct cylinder and that the gasket is not lost. Also, the cap may be arranged to radially contain the gasket such that radial expansion or other movement of the gasket, in response to forming a seal with the piercing element moved toward the gasket and gas outlet, is restrained and causes deformation of the gasket. As described more below, radial restraint of the gasket and the subsequent deformation in other directions caused thereby may provide benefits of an improved seal formed by the gasket with the piercing element and/or cylinder.

In one embodiment, voids may be present at upper and lower radially outer (and/or inner) regions of the inner space with the gasket located in the inner space and in an undeformed state. Also, the gasket may be arranged to at least partially fill the upper and lower void regions in response to forming a seal with the piercing element and the top surface of the cylinder. That is, deformation of the gasket caused by engagement with a piercing element and radial restraint of the gasket by the cap may cause the gasket to deform so as to at least partially fill void regions in the inner space of the cap. At least partial filling of void regions may further restrain the gasket, causing the gasket to deform in other regions that help assure a proper seal is made. Thus, void regions may be arranged to receive a deformed portion of a gasket, resist further gasket deformation and guide or otherwise influence additional gasket deformation to enhance the seal formed.

In one embodiment, the upper portion of the cap may include a sidewall and an upper wall having an annular shape that extends radially inwardly from the sidewall. The annular shaped upper wall may have a washer-like shape and include a radially inner part that defines the upper opening. Thus, the upper portion of the cap that extends inwardly from the cap sidewall may at least partially cover the upper surface of the gasket, e.g., to help hold the gasket in place. The gasket may be arranged to have an uppermost part of the upper surface of the gasket located radially inward of the radially inner part of the upper wall (i.e., radially inside the opening formed by the upper wall). Thus, for example, the uppermost part of the upper surface of the gasket may extend into the upper opening, e.g., to help ensure that the gasket makes suitable contact with a piercing element that enters the upper opening. In one embodiment, the inner space defined by the cap may have a cylindrical shape and the gasket may have a torus shape, e.g., a shape of an O-ring, and the gasket may be deformed to more closely approximate the cylindrical shape defined by the cap.

The piercing element may be arranged in a variety of different ways, including having surfaces tailored to cooperate with a particular gasket configuration. For example, the piercing element may include a lance arranged to pierce a gas outlet of a gas cylinder and a gasket-contacting surface arranged to contact and form a seal with the upper surface of the gasket. In one embodiment, the gasket-contacting surface includes a horizontal annular surface around a conical or cylindrical surface, and the surfaces may be both arranged to contact the upper surface of the gasket and urge the gasket toward the top surface of the cylinder. The piercing element may extend at least partially into the inner space of the cap, and may help define a space in which the gasket is confined. For example, with the piercing element introduced into the upper opening of the cap, the piercing element and cap may define the inner space to have a shape and a volume that is different than a shape and volume of the gasket. As a result, contact of the piercing element with the gasket may cause the gasket to change shape and to at least partially conform to the shape of the inner space defined by the cap and the piercing element. The piercing element may have an outer surface adjacent the gasket-contacting surface that is sized and shaped to fit closely within the upper opening of the cap, e.g., to help ensure that the gasket is suitably confined to the inner space of the cap. In one embodiment, the upper opening in the cap may be operable to engage the piercing element and prevent rotation of the cap (and an associated cylinder) relative to the piercing element. In other arrangements, however, rotation of the cylinder and cap relative to the piercing element may be allowed or caused.

The cap and gasket may be attached to, and be provided with a gas cylinder, e.g., so that the assembled cap, gasket and cylinder are purchased and used as a single unit. The cap may include one or more vent holes in a sidewall of the cap, e.g., to allow for venting of high pressure gas in the case that a seal formed by the gasket fails. The cap may include a stop that suitably positions the lower portion of the cap relative to the cylinder. This may help define a volume for the inner space as bounded by the upper portion of the cap and the top surface of the cylinder, and may make assembling the cap with the cylinder easier. That is, in embodiments where the volume of the inner space should be closely controlled to help ensure proper restraint of the gasket, a stop used to position the cap on the cylinder and properly define the inner space may allow an operator to screw or otherwise place a cap on a cylinder until the stop contacts the cylinder.

In another aspect of the invention, a method for establishing a seal with a gas cylinder includes providing a gas cylinder having a neck with a side surface and a top surface including a gas outlet, and a sealing arrangement including a cap having a lower portion engaged with the neck of a gas cylinder, and an upper portion defining an inner space and having an upper opening. A gasket may be located in the inner space defined by the upper portion of the cap. The cap may be introduced into a receiving opening of a gas delivery device, and a piercing element may be caused to move in the upper opening of the cap. The piercing element may be moved relative to the gas outlet such that the piercing element opens the gas outlet to release gas from the gas cylinder, and a seal may be formed between the piercing element and the gasket, and between the top surface of the cylinder and the gasket by moving the cylinder and the piercing element toward each other.

In one embodiment, forming the seals includes deforming the gasket to at least partially fill voids in the inner space defined by the cap. For example, the gasket may be radially restrained by the cap as the gasket is deformed with contact of the piercing element. Forming seals between the gasket and the piercing element and the top surface prior to the piercing element opening the gas outlet may be particularly desirable, since leakage of gas released by the cylinder may be prevented or otherwise resisted.

These and other aspects of the invention will be apparent from the following description and claims.

BRIEF DESCRIPTION OF THE DRAWINGS

Aspects of the invention are described below with reference to the following drawings in which like numerals reference like elements, and wherein.

DETAILED DESCRIPTION

Various aspects of the invention are described with reference to embodiments of a cap and gasket arrangement for interacting with at least a portion of a neck of a gas cylinder, e.g., to provide a seal between a piercing element and a top surface of the cylinder neck. Some embodiments are able to provide a seal that allows for axial and/or rotational movement of a cylinder neck relative to a receiving opening of a gas delivery device while still maintaining a gas-tight seal to prevent or otherwise resist the unwanted release of compressed gas. Maintaining a seal while permitting axial translation of the cylinder neck relative to the receiving opening may be important in some applications, e.g., to allow the cylinder neck to be advanced against a piercing element as needed to open the gas outlet of the cylinder while resisting gas leakage. As a result, gas leakage may be resisted throughout the cylinder piercing process, if piercing is used. Rotational movement of the cylinder relative to the receiving opening may allow for the formation of an improved seal, e.g., as a result of gasket, cylinder and cylinder receiving opening surfaces wiping relative to each other. It should be understood that various aspects of the invention may be used alone and/or in any suitable combination with each other, and thus various embodiments should not be interpreted as requiring any particular combination or combinations of features. Instead, one or more features of the embodiments described may be combined with any other suitable features of other embodiments.

Figure 1:
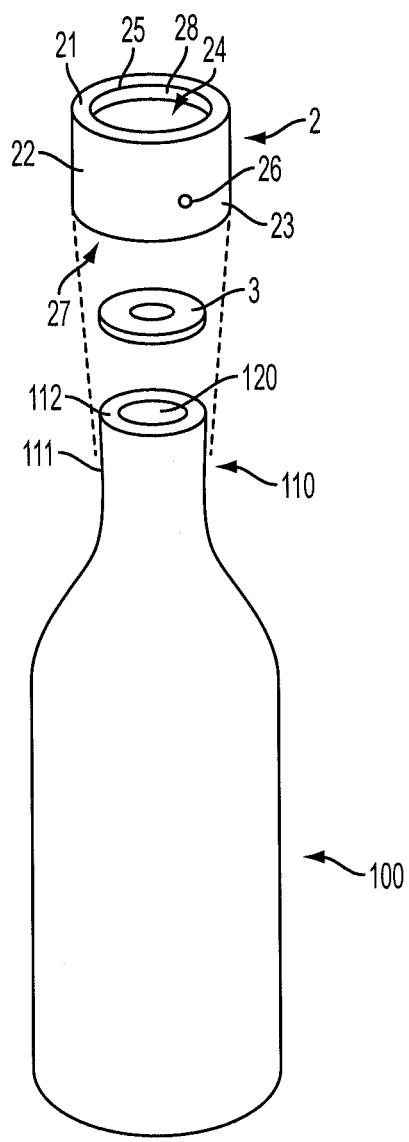
FIG. 1 shows an exploded view of a gas cylinder and cap/gasket arrangement in an illustrative embodiment.

As noted above, aspects of the invention relate to a cap and gasket for use with a gas cylinder, e.g., a cap and gasket that are arranged to engage with the neck of a cylinder and provide a seal between the cylinder and a cylinder receiver. FIG. 1 is a perspective view of a compressed gas cylinder 100, cap 2 and gasket 3 in an illustrative embodiment. As will be understood, the size, shape, material and/or other characteristics of a cap or gasket arranged to operate with a gas cylinder neck will depend at least in part on the shape, size, configuration, etc. of the gas cylinder with which the cap and gasket is to be used. In the embodiments described herein, gas cylinders 100 have a neck 110 of a generally cylindrical shape, i.e., the neck 110 has a generally flat or beveled top surface 112 surrounding a gas outlet 120 and a cylindrically-shaped side surface 111 extending downwardly from the top surface 112. However, aspects of the invention may be used with other gas cylinder neck arrangements, such as necks having a threaded or a frusto-conically shaped side surface 111, necks having a rounded or pointed top surface 112, and so on.

Also although the depicted cylinder 100 is relatively small and designed to be easily portable and disposable (e.g., having an overall length of about 3.5 inches and a diameter of about 1 inch), aspects of the invention may be used with larger or smaller and/or differently shaped gas storage containers. Thus, the term gas cylinder as used herein refers generically to a container arranged to store and release gas under pressure. Also, in this embodiment, the neck 110 has a diameter of about 0.375 inches and a length of about 0.5 inches, but other sizes are possible. Moreover, although the neck 110 is shown unthreaded in this embodiment, the neck can be threaded, unthreaded or have any other surface shape or features (such as a bayonet coupling), e.g., for coupling with a gas cylinder receiver or other coupling member. The neck 110 in this embodiment includes a gas outlet 120 that includes a cap or plug fitted in an opening of the neck 110 which can be opened via piercing with a piercing element (such as a sharpened or blunt lance) to release gas in the cylinder through the gas outlet 120. Of course, other arrangements for the gas outlet 120 are possible, such as an openable valve, a threaded cap or plug, and so on. For example, the gas outlet 120 may include a Schrader-type valve or other suitable arrangement that allows for gas release upon depression of a valve element during or after engagement of the cylinder with a gas delivery system. In such cases, a part of the cylinder receiver that moves the valve component to open the valve is referred to herein as a piercing element for simplicity and ease of reference. Also, while embodiments herein include a piercing element formed as a single part including a component that forms a hole in a gas outlet 120 and a component that defines sealing surfaces to engage with a gasket 3, the piercing element could be made of or otherwise include multiple parts, such as one component, such as a pin, to form a hole in a gas outlet 120, and one or more other components, such as a hub or sleeve around the pin which is movable in a hole of the hub or sleeve to pierce the gas outlet and then be retracted, that engages with the gasket 3. In such a case, only the hub or sleeve may form a seal with the gasket 3, but the hub or sleeve is considered part of the piercing element. Of course, the piercing element could be made as a single unitary part with other portions of the cylinder receiver, or as a separable part as shown.

The cap and gasket arrangement and gas cylinder may be employed with a gas delivery system that uses gas supplied by the cylinder for any suitable purpose. For example, embodiments have been found useful with systems that introduce an inert or otherwise minimally-reactive gas into a wine bottle for dispensing and storing wine as described in U.S. Pat. No. 7,712,637. However, other applications are possible, such as tire inflation, beverage carbonation, etc. Exemplary compressed gasses contained in a cylinder may include air, oxygen, carbon dioxide, argon, neon, helium, nitrogen, and mixtures thereof. Pressure ranges for such cylinders can range from around 1000 psi to around 3500 psi, though most commercial cylinders of the size and shape shown in FIG. 1 are at 2600 psi or 3000 psi.

The cap 2 and gasket 3 shown in FIG. 1 are arranged to engage with the neck 110 of the cylinder 100 to provide one or more seals with the neck 110 and a cylinder receiver of a gas delivery system (not shown). The seal(s) may be a gas-tight seal, e.g., a seal that resists the unwanted leakage or other flow of gas along a surface of the neck 110 or portion of the cylinder receiver. Thus, a gas-tight seal need not be completely leak-free, but rather suitably resistant to gas leakage so as to be considered suitable for use in employing gas provided by the gas cylinder. For example, the seal may be suitable to sustain a modest loss of pressure in a cylinder over the course of a month or two such that the gas delivery device is still usable for its intended purpose. The cap 2 may include a vent 26 (e.g., a hole formed through the sidewall 23) that allows gas to pass from an inner space 24 of the cap 2. Such a vent 26 may be useful in circumstances where a seal formed by the gasket 3 fails, thus allowing gas to escape from the inner space 24. The vent 26 may include multiple holes, slots or other passageways and may be positioned in any suitable location on the cap 2.

In this illustrative embodiment, the cap 2 is arranged to engage with the neck 110 of the cylinder 100 (e.g., by threads, adhesive, a combination of the two, or other) and hold the gasket 3 generally in a position to form a seal with the cylinder 100 and a part of the cylinder receiver, such as a piercing element. In this embodiment, the cap 2 has an inverted cup-like shape defined by an upper portion 21 and lower portion 22. The lower portion 22 in this illustrative embodiment includes a cylindrical sidewall member 23 that defines a cup-shaped or cylindrically-shaped interior cavity and a lower opening 27 for receiving the neck 110 of a cylinder. The interior cavity can be tapered, contain a fillet, include an internal thread or otherwise be arranged to suitably engage the neck 110 of the cylinder 100. The cap 2 is also arranged to define, together with the top surface 112 of the cylinder 100, an inner space 24 in which the gasket 3 is received and held by the cap 2. In this embodiment, the inner space is defined by the sidewall 23 of the cap 2 and an upper wall 25 that has an annular shape and extends radially inwardly from the sidewall 23. As can be seen, the upper wall 25 includes a radially inner part that defines the upper opening 28 of the cap, although such an upper wall 25 need not necessarily be provided. Instead, the sidewall 23 may itself define the upper opening 28. Alternately, the upper wall 25 may be arranged in other ways, e.g., to include a plurality of inwardly directed spokes, protrusions or other features to help retain the gasket 3 in the inner space 24. As another example, the upper wall 25 may be formed as a frustoconical or hemispherical wall element, e.g., so that the cap 2 has a somewhat pointed upper surface. Also, the outer surface formed by the upper wall 25 need not necessarily match the shape of the inside surface of the upper wall 25. For example, if the cap had a pointed exterior shape, the inner space defined by the cap 2 may be cylindrical or another shape that does not necessarily match with or correspond to the outer shape of the cap.

To assemble the cap 2 and gasket 3 on the cylinder 100, the gasket 3 may be placed on the neck 110 and the cap 2 placed over the gasket 3 and the neck 110 to act like a sleeve or cover with the lower portion 22 of the cap 2 engaged with the neck 110, e.g., by threading, an adhesive, a friction fit, etc. Alternately, the gasket 3 may be placed in the inner space 24 of the cap 2, and the cap 2 then engaged with the neck 110. In another embodiment, the gasket 3 may be co-molded with the cap 2, adhered to a portion of the cap 2, or otherwise attached to the cap 2 so that the cap 2 and gasket 3 are not easily separated. In yet another embodiment, the cap 2 may be engaged with the neck 110, and the gasket 3 then inserted through the upper opening 28, or through a slot or other opening in the sidewall 23. Regardless, the gasket 3 may be sized and arranged to fit in the inner space 24 defined by the upper portion of the cap 2.

Figure 2:
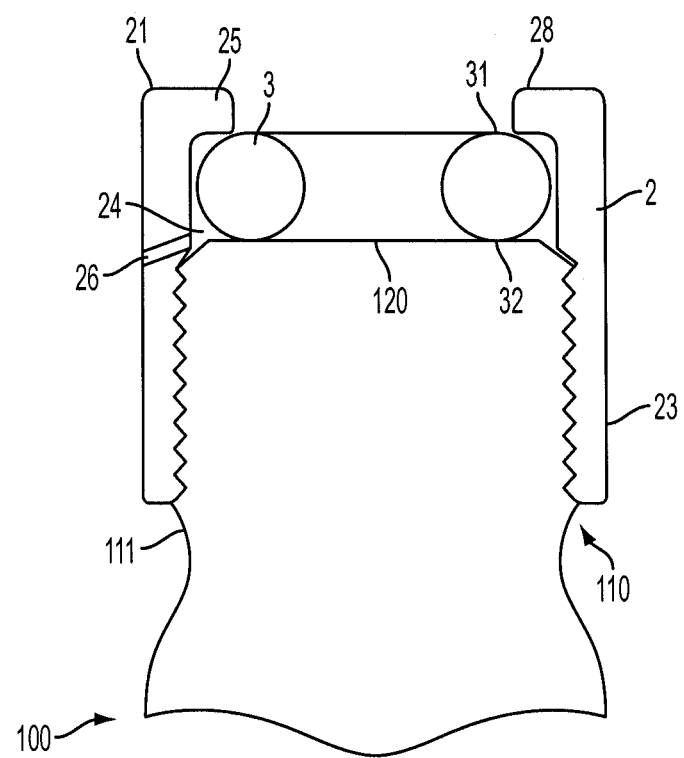
FIG. 2 shows a cross sectional view of the FIG. 1 embodiment in an assembled condition.
Figure 3:
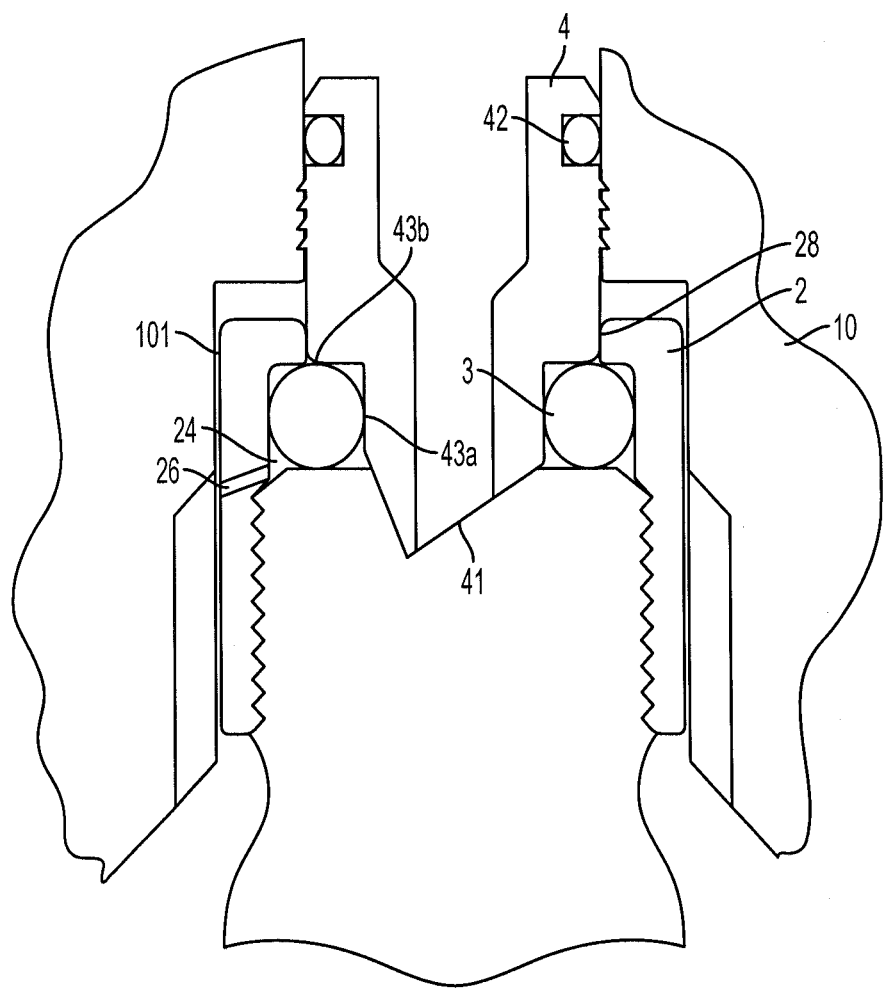
FIG. 3 shows the cross sectional view of FIG. 2 with a piercing element received by an upper opening of the cap.

FIG. 2 shows a cross sectional view of the FIG. 1 embodiment in an assembled state, and FIG. 3 shows the FIG. 2 view with a piercing element 4 of a cylinder receiver 10 received into the upper opening 28 of the cap 2. In this embodiment, the cylinder receiver 10 includes a receiving opening 101 that is shaped and sized to receive the cap 2 and engage with the gasket 3 to form a seal, although other arrangements are possible. The cap 2 in this embodiment is shown having an internal thread that engages with a thread on the neck 110 to engage the cap 2 with the cylinder 100, although other arrangements are possible. Also, in this embodiment, the gasket 3 has an o-ring configuration, e.g., the gasket 3 has a torus shape, and the cap 2 defines an inner space 24 with a cylindrical shape to house the gasket 3. As will be appreciated, particularly in view of the discussion below, the shape of the gasket 3 and inner space 24 may be arranged in other ways, e.g., the inner space 24 may be defined by a curved, instead of straight, sidewall, the gasket 3 may have a flat, annular (washer-like) configuration, etc. Also, the cap 2 may include a stop, such as a shoulder, rib, tab or other feature (e.g., on the inner surface of the sidewall 23) that serves to limit the extent to which the neck 110 is received into the lower portion 22 of the cap. For example, if the cap 2 has an internal thread, the thread may end at a point suitable to prevent threading of the cap onto the neck 110 beyond a certain point. Alternately, a shoulder, ridge, rib, tab or other feature may be formed on the interior of the sidewall 23 to prevent the neck from being received into the cap 2 beyond a certain point. This stop may help define a volume for the inner space 24 to house the gasket 3, e.g., to allow sufficient volume for the gasket 3 to deform or otherwise move when forming a seal with the cylinder and/or a piercing element.

The gasket 3 includes an upper surface 31 arranged to form a seal with a piercing element 4 that is received in the upper opening 28 of the cap 2, and a lower surface 32 arranged to form a seal with the top surface 112 of the cylinder. As can be seen in FIG. 2, at least a portion of the upper surface 31 of the gasket 3 may be covered by the cap 2, e.g., the upper wall 25 may cover part of the upper surface 31 of the gasket 3. This feature may provide different functions, such as helping to retain the gasket 3 in the inner space 24, defining a region of the gasket 3 that is exposed for contact with a piercing element 4 that passes into the upper opening 28, and/or influencing how the gasket 3 moves in the inner space 24 when forming one or more seals. In one embodiment, the gasket may have an uppermost part of the upper surface 31 (such as the upper part of the torus) located radially inward of a radially inner part of the upper wall 25 that defines the upper opening 28. For example, the uppermost part of the upper surface 31 of the gasket 3 may extend into, and possibly through, the upper opening 28 as shown in FIG. 2. Such an arrangement may help prevent the cap 2 from deforming the gasket 3 prior to the piercing element 4 contacting the gasket 3, and instead cause deformation of the gasket 3 to be initiated with contact of the piercing element 4 rather than by contact with the cap 2. This feature may also help establish an early seal with the piercing element 4, e.g., to help resist gas leakage as the cylinder is pierced, and help the cap 2 maintain a lower profile or height relative to the top surface 112 of the cylinder 100. Also, in this arrangement the uppermost surface of the cap 2 will generally be spaced from, and avoid contact with, the receiving opening 101, e.g., areas of the opening 101 around the piercing element 4. This allows the cylinder top surface 112 and gasket 3 to be moved suitably toward the piercing element 4 without interference of the cap 2.

In another aspect of the invention, the cap may be arranged to radially contain the gasket such that radial expansion or other movement of the gasket is restrained in response to the piercing element moving toward the gasket and gas outlet of the cylinder to form a seal. For example, as the piercing element 4 is introduced into the upper opening 28 of the cap 2, e.g., so that a lance portion 41 of the piercing element 4 moves toward the gas outlet 120, the gasket contacting surfaces 43 of the piercing element 4 may contact the upper surface 31 of the gasket 3 and urge the gasket 3 to move radially outwardly toward the cap sidewall 23 and axially downwardly toward the top surface 112 of the cylinder 100. However, the cap 2 may be arranged to radially restrain the gasket movement, e.g., so that the gasket 3 cannot radially move beyond a particular extent. This may cause the gasket 3 to maintain contact with the gasket contacting surfaces 43 of the piercing element 4 and form a suitable seal, e.g., during piercing of the gas outlet 120. Radial constraint of the gasket 3 may also cause the gasket 3 to deform, e.g., so that the gasket 3 changes shape from a torus to a shape that more closely matches the shape of the inner space 24, including a shape of the piercing element 4 at the gasket contacting surfaces 43. Such deformation may help the gasket 3 form a suitable seal with the piercing element 4 and top surface 112 of the cylinder 100, e.g., by allowing the gasket 3 to conform to the sealing surfaces.

In another aspect of the invention, the cap may define the inner space where the gasket is housed to allow the gasket to deform or otherwise move with contact of the piercing element, yet limit the extent to which the gasket can deform or otherwise move. For example, the cap may define the inner space to have voids present at upper and lower radially outer and/or inner regions of the inner space with the gasket located in the inner space and in an undeformed state. In FIG. 2, these voids can be seen at areas near the cap sidewall 23 at the top surface 112 of the cylinder and at the upper wall 25. Voids may also be present at radially inner regions near the gasket contacting surfaces 43 of the piercing element 4 prior to significant gasket deformation. However, as can be seen in FIG. 3, the gasket and the cap may be arranged so that as the gasket deforms, the gasket at least partially fills the void regions in response to forming a seal with the piercing element and the top surface of the cylinder. The gasket may fill any suitable voids in the inner space 24, including spaces at the gasket contacting surfaces 43 of the piercing element. For example, in this embodiment, the gasket contacting surfaces of the piercing element include a horizontal annular surface 43*b* around a conical or cylindrical surface 43*a* that are both arranged to contact the upper surface 31 of the gasket and urge the gasket 3 toward the top surface 112 of the cylinder. A void is initially present near the junction of the horizontal annular surface 43*b* and the conical or cylindrical surface 43*a*, e.g., because the gasket 3 does not have a shape that matches the piercing element shape in this area prior to deformation. However, as the gasket 3 is deformed, the gasket 3 may conform to the void(s) at the gasket contacting surfaces 43. While the gasket contacting surface 43 in this embodiment includes a horizontal component and a vertical or angled component, the contacting surface 43 may include only a horizontal component, or only a vertical or angled component.

In another aspect of the invention, the cap and the piercing element (with the piercing element introduced into the upper opening of the cap) may define the inner space to have a shape and a volume that is different than a shape and volume of the gasket prior to deformation. For example, the inventors have found that defining the inner space to have a volume that is about 5-20% (e.g., about 10%) greater than a volume of gasket just prior to when the gasket first deforms to a significant extent provides a significant improvement in sealing capability. (In some embodiments, the difference in volume will depend on the durometer of the gasket 3 or other measure of the gasket's ability to deform. Larger durometer measures may require a closer similarity in inner space and gasket volumes.) Significant deformation typically occurs when the piercing element places axial deforming force on the gasket (such as when the horizontal contacting surface 43*b* moves the top surface 31 of the gasket), but may occur at other times. In some cases, it has been found that defining the inner space to have a volume of less than about 5% greater than the gasket (as measured at a time when the gasket first begins significant deformation) seriously impairs the gasket's ability to form a seal with the piercing element and/or the top surface of the cylinder. Similarly, if the volume of the inner space is too large, the gasket may be allowed to deform too much, preventing the formation of appropriate seals. Also, by having the shape of the inner space be defined to be different from the shape of the gasket (at least at the gasket contacting surfaces of the piercing element and/or the cylinder), the gasket may be forced to deform at the gasket contacting surfaces to form a suitable seal. Such deformation tends to enhance the seal created. As a result, contact of the piercing element with the gasket as the piercing element moves toward the gas outlet of the cylinder may cause the gasket to change shape and to at least partially conform to the shape of the inner space defined by the cap and the piercing element.

Since the gasket may be caused to deform as the piercing element is moved to engage the cylinder, the piercing element may be arranged to help maintain the gasket appropriately in the inner space. For example, in some embodiments, the piercing element 4 may have an outer surface adjacent the gasket-contacting surface 43 that is sized and shaped to fit closely within the upper opening 28 of the cap 2. In the embodiment of FIG. 3, this outer surface may include a cylindrical surface just above the horizontal contacting surface 43b that may be sized and shaped to fit closely within the upper opening 28. This may help prevent the gasket from squeezing into a gap between the upper wall 25 at the upper opening 28 and the piercing element 4, or otherwise help to properly contain the gasket 3 in the inner space 24.

In some embodiments, the cap and piercing element or other portion of a cylinder receiver may be arranged to help resist rotation of the cap relative to the piercing element or cylinder receiver. For example, the piercing element and the cap at the upper opening 28 may be splined, grooved, toothed or otherwise arranged in a complementary fashion so that the piercing element and cap engage to prevent rotation of the cap relative to the piercing element. In another arrangement, the outer surface of the sidewall 23 of the cap 2 may be splined, toothed, etc., to engage with corresponding grooves or other features in the opening 101 of the cylinder receiver 10. However, in some embodiments, relatively modest rotation of the cap and/or gasket relative to the piercing element (e.g., about 5 to 90 degrees) may help improve seals that are formed. This rotation may be provided by rotating the cylinder as it is introduced to the receiver opening 101, e.g., by engagement of spiral features of the cap with corresponding features of the receiver opening 101 or other means.

Gaskets in accordance with aspects of the invention may be made of, or otherwise include, an elastomeric material such as a polymer, elastomer, rubber, or composite thereof. Exemplary materials include natural rubber and thermoplastic elastomers and more specifically santoprene, neoprene, silicone, urethane, and butyl rubber. The durometer of the material may be 70-95, but values between 50 and 100 on the shore A scale can be suitable for various applications. Those of skill will appreciate that a choice of durometer may require adjustment to component size, shape or other features, such as requiring thicker or thinner components to provide desired sealing strength, a suitable insertion force to engage the cylinder neck/gasket with a receiving opening, etc. A cap may similarly be made of any suitable material or combination of materials, such as metal, plastic, fiber-reinforced plastic, and/or other composites. The top surface 112 of the cylinder and/or the gasket contacting surfaces 43 of the piercing element may include a suitably smooth finish, e.g., to help create a suitably leak-resistant seal. Generally, smoother surfaces may provide a more leak-resistant seal. Gasket contacting surfaces of the cap may also be provided with a suitably smooth surface finish, e.g., to help allow the gasket to deform and otherwise move relative to the cap during piercing element introduction.

The cap and gasket arrangements disclosed herein are intended for use with threaded and/or unthreaded necks of various containers, and a variety of methods may employed to engage and/or seal a cap thereto. For example, a cap may be threaded onto a threaded neck of a cylinder or stretched over a threaded or unthreaded neck, e.g., relying on friction to maintain engagement of the cap with the cylinder neck. Alternatively, a cap may be shrink fit, heated, bonded, welded, cross linked, adhered with an adhesive, chemically altered, or transformed to engage a cap with the neck of the cylinder. Such engagement may form a seal between the cap and the cylinder.

As mentioned above, aspects of the invention relate to gas cylinder engagement with different types of gas cylinder receivers, including those that threadedly engage with a gas cylinder, those that receive a gas cylinder that is slid axially into a receiver opening and others. For example, U.S. Pat. No. 4,867,209; U.S. Pat. No. 5,020,395; U.S. Pat. No. 5,163,909 describe different cylinder engagement arrangements and are hereby incorporated by reference with respect to their teachings regarding mechanisms for engaging a gas cylinder with a cylinder receiver and/or receiving opening. Note that the external surface of a cap may be threaded to allow the cap to be threadedly engaged with a threaded opening of a cylinder receiver. A cylinder receiver 10, a portion of one of which is shown in FIG. 3, may be part of a gas delivery mechanism or system in a device that uses gas supplied by a cylinder, and may include elements such as a regulator to control a pressure of gas provided, a piercing element to pierce the gas outlet of a cylinder, a valve, spout, nozzle, or hose to control and deliver gas to a desired location, such as a wine bottle, bicycle tire, beverage carbonator, etc. The cylinder receiver 10 may include a receiver opening 101 (as shown in FIG. 3) that is arranged to engage with at least a portion of a gas cylinder neck 110 having an attached cap 2 and gasket 3. In this example of FIG. 3, the receiver opening 101 is arranged as a bore or hole that is sized and shaped to receive a cap and gasketed cylinder neck that is axially slid into the hole, although other arrangements are possible for the receiver opening 101. For example, the receiver opening 101 may include a clamp arranged so that the neck 110 is received into the opening 101 without resistance and that clamps onto the cap 2. In another arrangement, the opening 101 may include a threaded element that engages with the cap or cylinder itself. In short, a variety of different receiver opening arrangements are possible.

In this illustrative embodiment, while the hole of the cylinder receiver 10 may be uniform in shape, such as a cylindrically-shaped hole with uniform walls, the opening 101 may have a stepped diameter (with one or more smaller diameters located at inner portions of the hole, contain a taper, have a chamfer or other arrangement. The receiving opening 101 may also include one or more grooves to allow gas to escape (e.g., gas emitted through the vent 26) in case of a seal failure. The piercing element 4 in this embodiment is engaged with a bore of the receiver 10 such that a sealing element 42 (e.g., an o-ring) sealingly engages with the bore wall. Barbs are also provided on the piercing element 4 to hold the piercing element 4 in place in the bore, although other arrangements are possible, such as a threaded engagement, an adhesive, welding, forming the piercing element 4 and other portions of the receiver 10 as a single unitary part, etc. Of course, in some arrangements, no piercing element may be needed at all, such as those in which the gas cylinder includes a valve.

Although embodiments described above have a cap/gasket and cylinder arranged to operate with a piercing element that is carried by a cylinder receiver, a piercing element (if required) may be carried on the cylinder. For example, a piercing element 4 may be positioned at least partially in the inner space 24 and held in place by the cap 2. Engagement of cap/piercing element/gasket/cylinder with a cylinder receiver may cause the piercing element to be moved toward the gas outlet 120 of the cylinder, forming a seal between the gasket and the piercing element and opening the cylinder. Thus, a piercing element need not necessarily be fixed to a cylinder receiver, but may be attached to the cap/gasket arrangement or otherwise provided as a separate element.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A gas cylinder sealing arrangement for a gas cylinder having a neck with a side surface and a top surface including a gas outlet, the sealing arrangement comprising:
   a cap having a lower portion arranged to engage with a neck of a gas cylinder to retain the cap on the gas cylinder, and an upper portion arranged to extend above a top surface of the gas cylinder and define an inner space, the upper portion having an upper opening to receive a piercing element into the upper opening; and
   a gasket sized to fit in the inner space defined by the upper portion of the cap, the gasket having an upper surface, a region of the upper surface being exposed at the upper opening of the cap and arranged to contact a piercing element received in the upper opening of the cap to pierce a gas outlet of the cylinder, and a lower surface arranged to form a seal with the top surface of the cylinder;
   wherein the upper portion of the cap is arranged to radially contain the gasket such that radial expansion of the gasket in response to forming a seal with the piercing element moved into the upper opening and toward the gasket is restrained and causes deformation of the gasket, and
   wherein the cap and gasket are unattached to any piercing element arranged to pierce the gas outlet of a gas cylinder.

2. The sealing arrangement of claim 1, wherein voids are present at upper and lower radially outer regions of the inner space with the gasket located in the inner space and in an undeformed state, and wherein the gasket is arranged to at least partially fill the upper and lower radially outer void regions in response to forming a seal with the piercing element moved into the upper opening and with the top surface of the cylinder.

3. The sealing arrangement of claim 1, wherein the upper portion of the cap includes a sidewall and an upper wall having an annular shape that extends radially inwardly from the sidewall and includes a radially inner part that defines the upper opening.

4. The sealing arrangement of claim 3, wherein the gasket has an uppermost part of the upper surface located radially inward of the radially inner part of the upper wall.

5. The sealing arrangement of claim 4, wherein the uppermost part of the upper surface of the gasket extends into the upper opening.

6. The sealing arrangement of claim 3, wherein the inner space has a cylindrical shape and the gasket has a torus shape.

7. The sealing arrangement of claim 1, wherein the lower portion of the cap includes an internal thread arranged to engage with an external thread on a cylinder neck.

8. The sealing arrangement of claim 1, wherein the gasket has a torus shape.

9. The sealing arrangement of claim 1, further comprising a piercing element separate from the cap and gasket, the piercing element including a lance arranged to pierce a gas outlet of a gas cylinder and a gasket-contacting surface arranged to contact and form a seal with the upper surface of the gasket.

10. The sealing arrangement of claim 9, wherein the gasket-contacting surface includes a horizontal annular surface around a conical or cylindrical surface that are both arranged to contact the upper surface of the gasket and urge the gasket toward the top surface of the cylinder.

11. The sealing arrangement of claim 9, wherein the cap and the piercing element are arranged such that with the piercing element introduced into the upper opening, the cap and piercing element define the inner space to have a shape and a volume that is different than a shape and volume of the gasket.

12. The sealing arrangement of claim 11, wherein contact of the piercing element with the gasket causes the gasket to change shape and to at least partially conform to the shape of the inner space defined by the cap and the piercing element.

13. The sealing arrangement of claim 9, wherein the piercing element has an outer surface adjacent the gasket-contacting surface that is sized and shaped to fit closely within the upper opening of the cap.

14. The sealing arrangement of claim 1, further comprising the gas cylinder, and wherein the cap is attached to the neck of the cylinder.

15. The sealing arrangement of claim 1, wherein the cap includes one or more vent holes in a sidewall of the cap.

16. The sealing arrangement of claim 1, wherein the cap includes a stop to position the lower portion of the cap relative to the cylinder.

17. The sealing arrangement of claim 1, wherein the cap includes a stop to contact the neck of the cylinder and define a volume for the inner space as bounded by the upper portion of the cap and the top surface of the cylinder.

18. The sealing arrangement in claim 1, wherein the upper portion of the cap at least partially covers the upper surface of the gasket.

19. The sealing arrangement in claim 1, wherein the upper opening in the cap is operable to engage a piercing element and prevent rotation of the cylinder relative to the piercing element.

20. A method for establishing a seal with a gas cylinder, comprising:
   providing a gas cylinder having a neck with a side surface and a top surface including a gas outlet, and a sealing arrangement including a cap and a gasket, the cap having a lower portion engaged with the neck of a gas cylinder, and an upper portion defining an inner space and having an upper opening, the gasket being located in the inner space defined by the upper portion of the cap and having a region of an upper surface of the cap exposed at the upper opening of the cap;
   introducing the cap into a receiving opening of a gas delivery device;
   receiving a piercing element into the upper opening of the cap;
   moving the piercing element relative to the gas outlet such that the piercing element contacts the exposed region of the gasket and opens the gas outlet to release gas from the gas cylinder; and
   forming a seal between the piercing element and the gasket and between the top surface of the cylinder and the gasket by moving the cylinder and the piercing element toward each other.

21. The method of claim 20, wherein the step of forming a seal includes deforming the gasket to at least partially fill voids in the inner space.

22. The method of claim 21, wherein the step of forming a seal includes radially restraining the gasket.

23. The method of claim 20, wherein the step of forming a seal includes forming seals between the gasket and the piercing element and between the gasket and the top surface prior to the piercing element opening the gas outlet.

* * * * *